United States Patent [19]
Moradians

[11] Patent Number: 5,573,359
[45] Date of Patent: Nov. 12, 1996

[54] CARGO SECURING DEVICE

[75] Inventor: Edward Moradians, Canoga Park, Calif.

[73] Assignee: Ancra International Corporation, Hawthorne, Calif.

[21] Appl. No.: 438,052

[22] Filed: May 8, 1995

[51] Int. Cl.$^6$ .................................................. B63B 25/22
[52] U.S. Cl. ............................ 410/69; 410/77; 410/83
[58] Field of Search .................................. 410/52, 69, 70, 410/77, 81, 83, 94–96, 104–107, 111

[56] References Cited

U.S. PATENT DOCUMENTS

| | | |
|---|---|---|
| 3,262,588 | 6/1966 | Davidson . |
| 3,306,234 | 2/1967 | Hansen et al. . |
| 3,334,718 | 8/1967 | Davidson . |
| 3,480,239 | 11/1969 | Jensen . |
| 3,778,012 | 12/1973 | Fernandez ............... 410/69 |
| 3,933,101 | 1/1976 | Blas ............................ 410/69 |
| 3,986,460 | 10/1976 | Voigt et al. .............. 410/69 |
| 4,077,590 | 3/1978 | Shorey . |
| 4,379,668 | 4/1983 | Pelletier .................. 410/77 |
| 4,415,298 | 11/1983 | Voigt ....................... 410/69 |
| 4,583,896 | 4/1986 | Vogg et al. .............. 410/69 |
| 5,316,242 | 5/1994 | Eilenstein-Weigmann et al. ... 410/111 |
| 5,356,249 | 10/1994 | Hove ....................... 410/70 |

Primary Examiner—David A. Bucci
Assistant Examiner—Gregory A. Morse
Attorney, Agent, or Firm—Edward A. Sokolski

[57] ABSTRACT

A cargo securing device is removably mounted on the floor of a vehicle such as an aircraft, this device being adapted to guide palletized loads to prevent substantial movement thereof during transportation. The device is spring urged to a retracted position wherein it lies substantially flat to permit the passage of cargo thereover during loading. The device is manually raised to its operative position against the spring action. When in its raised operative position, a pair of locking pins slidably mounted on the central portion of the device are spring urged into channels formed in an outer support portion of the device to retain the device in the raised position. A lever is manually operated to withdraw the locking pins from the channels thereby permitting the device to be driven by the spring to its retracted position. In its raised operative position, the device has a dog which engages the base of a pallet to restrict vertical movement thereof. This dog is mounted on the device for pivotal motion so that cargo not fitting thereunder can pass by. Further, the device has a side wall which restricts movement of the cargo.

6 Claims, 4 Drawing Sheets

CARGO SECURING DEVICE

BACKGROUND OF THE INVENTION

1. Field of the Invention

This invention relates to cargo handling devices and more particularly to a device for securing cargo in place during transportation in a vehicle such as an aircraft.

2. Description of the Related Art.

In the loading and transportation of cargo on a vehicle such as an aircraft, devices have been developed in the prior art which are removably installed on the floor of the vehicle and are used for restraining the movement of such cargo during transportation. To enable loading of the vehicle, such devices are adapted to be lowered to a retracted position so that the cargo can pass thereover to their loaded positions for transportation. To facilitate loading, such devices must be adaptable to be rapidly retracted for loading and subsequently raised to their operative position to retain the cargo in position. Devices have been developed in the prior art which provide the aforesaid functions which are particularly adapted for handling palletized loads. Such a device is described in U.S. Pat. No. 3,306,234 issued Feb. 28, 1967 to Hansen et al. The device of this patent is removably installed on the floor of the vehicle and has a dog thereon for engaging the bottom of a pallet and a side wall to restrain the movement of the loaded pallet. The device of this patent can also be lowered to a retracted position to permit the passage of cargo thereover during loading. In this prior art device, however, the device must be manually pushed to its retracted position increasing the time for such operation. Further, the dog employed for engaging the pallet is not pivotally supported so that it cannot permit passage of cargo if need be.

BRIEF SUMMARY OF THE INVENTION

The cargo securing device of the present invention is a significant improvement over the prior art in providing a device which operates to effectively retain the cargo in its loaded position yet which can be more rapidly be placed in its retracted position. Further, the device of the present invention permits the ready passage of loads not adapted to be retained thereby, by virtue of a pivotally mounted retaining dog.

The device of the present invention has a mounting base frame which has post members thereon which engage mating receptacles on a track on the floor of the vehicle for retention therein. Front and rear wall portions of the device are pivotally mounted on the frame and are interconnected by a plate which is pivotally attached to each of the wall portions. The plate has a dog member pivotally mounted thereon, this dog member extending in a directly laterally away from the front and rear wall portions. The plate has a central rearwardly extending portion which is pivotally attached to the rear wall portion. The central portion of the plate has a channel formed therein in which a pair of locking pins are slidably mounted. A spring is centrally mounted between the locking pins and urges such pins apart laterally away from the center of the central portion into channels formed in the rear wall portion. When the locking pins are in the channels of the rear wall and the channel of the central portion of the plate, they form a bridge between the plate and the rear wall thereby locking the device in an upright operating position. A torsion spring which is supported on the base frame urges the device towards its retracted position but is prevented from achieving such action by the locking pins. A lever is pivotally supported on the rear wall portion and has a pair of cams thereon which abut against posts formed on the spring urged locking pins. When the lever is manually actuated it drives the pins out of the channels in the rear wall portion thereby releasing the central portion of the plate from the rear wall and permitting the torsion spring to drive the device to its retracted position.

It is therefore an object of the invention to provide an improved cargo securing device for securing palletized loads in a vehicle.

It is a further object of the invention to provide a vehicle securing device which can more rapidly be changed over between its operative and retracted positions.

Other objects of the invention will become apparent in connection with the following description in conjunction with the accompanying drawings.

DETAILED DESCRIPTION OF THE INVENTION

Figure 1:
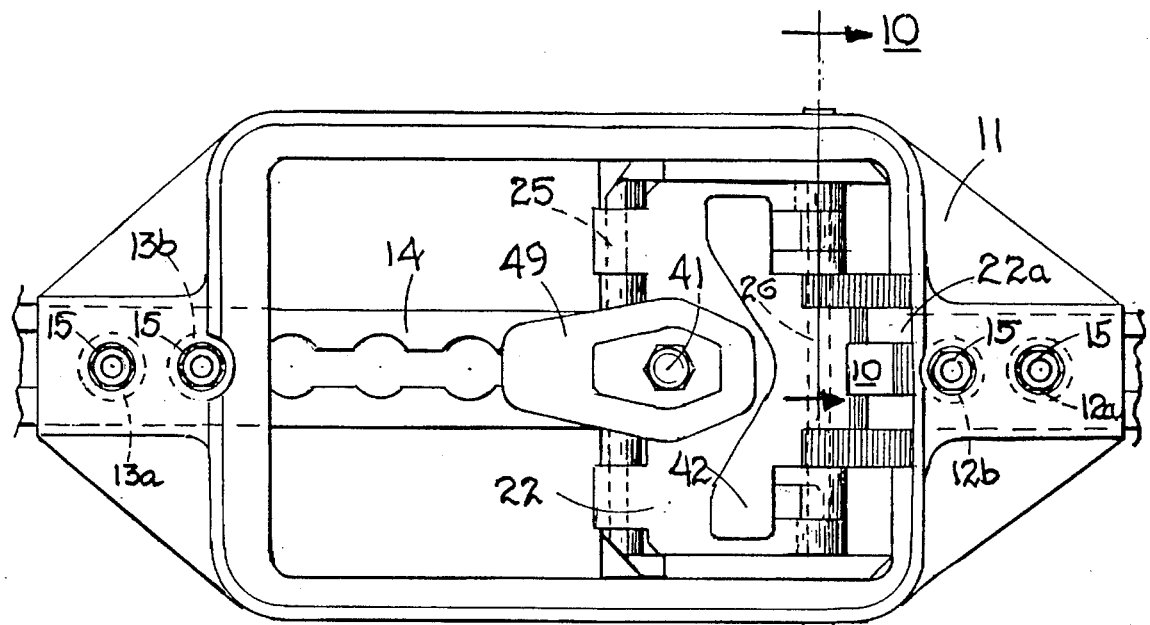
FIG. 1 is a top plan view of a preferred embodiment of the invention shown in its raised position.

Referring to FIGS. 1–5, mounting base frame 11 has two pairs of post members 12a, 13a and 12b, 13b which are used to removably mount the base frame to slotted track 14 which is attached to the floor of a vehicle(not shown). These post members are secured to track 14 by means of nuts 15 once the bottom ends of the post members are installed in the track. An attachment as shown in U.S. Pat. No. 3,306,234, referred to above, can be used in lieu of the attachment member of the preferred embodiment. The '234 patent shows the nature of the track 14 and how it can be employed in securing in post members.

Pivotally supported on frame 11 by means of pins 16 and 17 are rear wall and front wall portions 19 and 20, respectively. The rear and front wall portions are pivotally interconnected by top plate 22 which is pivotally attached to the front and rear wall portions by means of pivot pins 25 and 26 respectively. Top plate 22 has a central portion 22a which extends rearwardly and is pivotally supported on pivot pin 26 and thus connected to rear wall portion 19.

Figure 2:
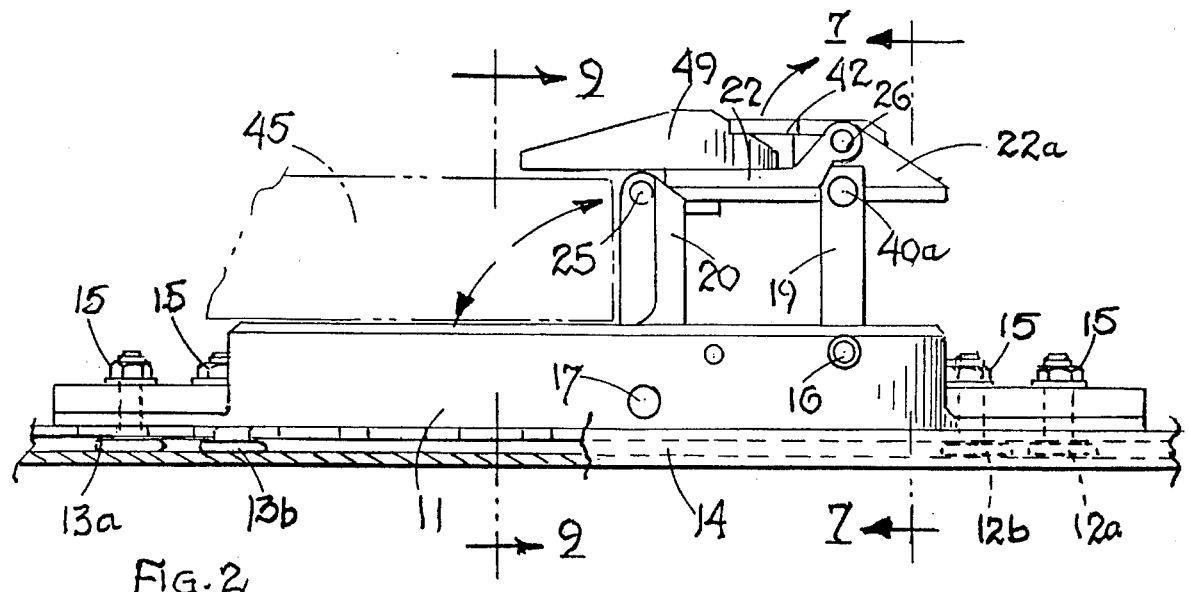
FIG. 2 is a side elevational view of the preferred embodiment of the invention in its raised position.
Figure 3:
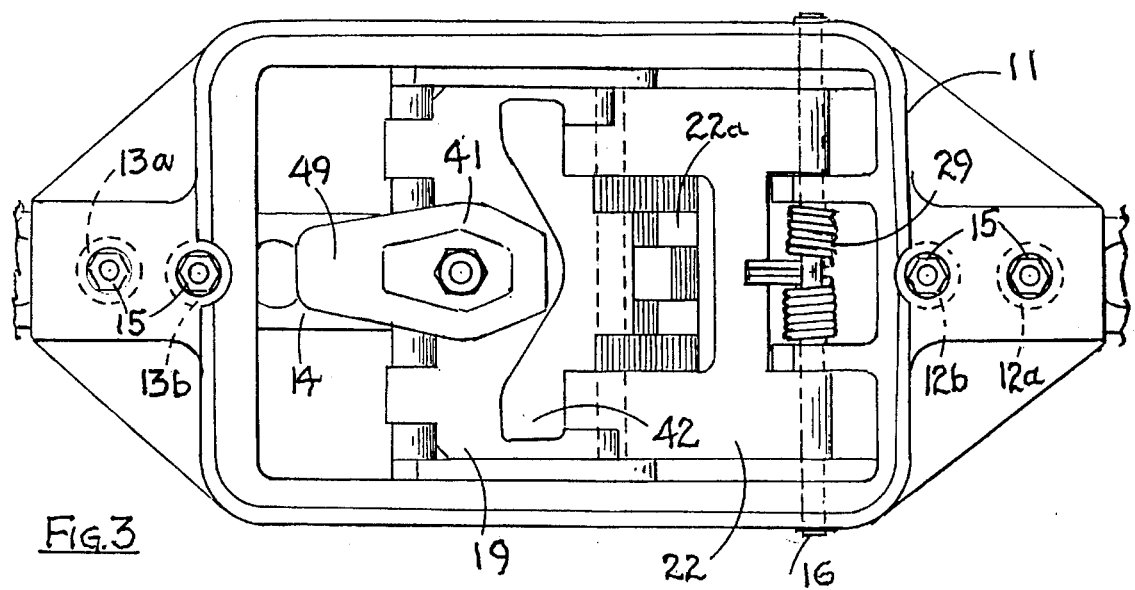
FIG. 3 is a top plan view of the preferred embodiment in its retracted position.
Figure 4:
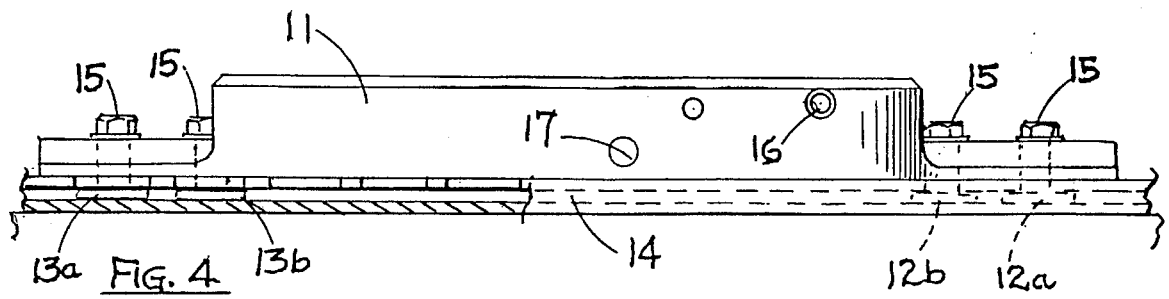
FIG. 4 is a side elevational view of the preferred embodiment in its retracted position.
Figure 5:
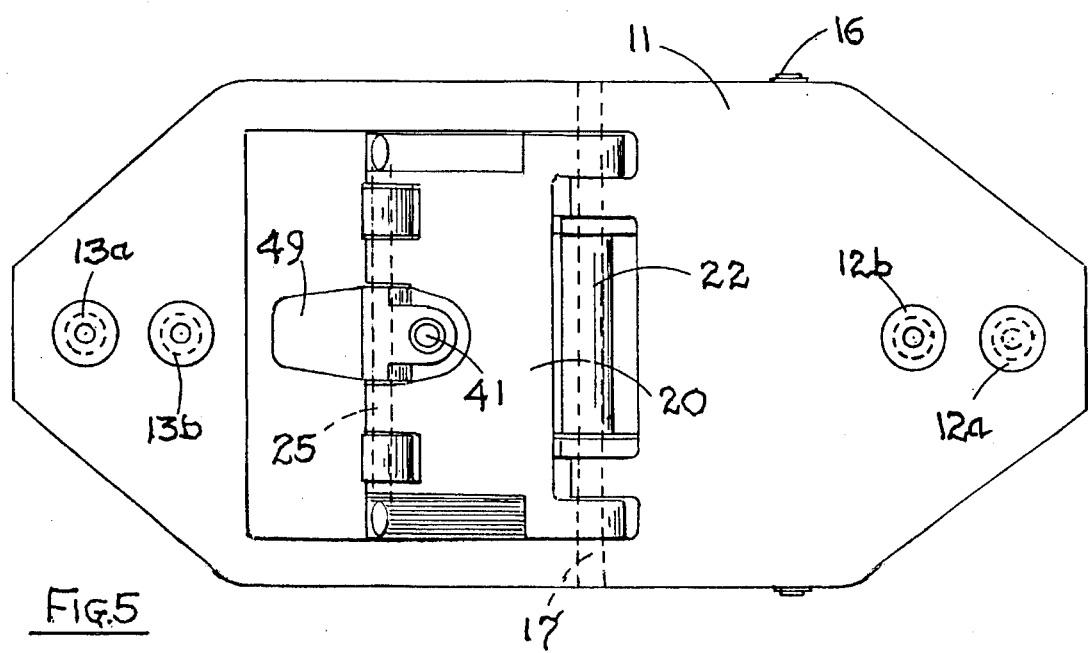
FIG. 5 is a bottom plan view of the preferred embodiment.
Figure 10:
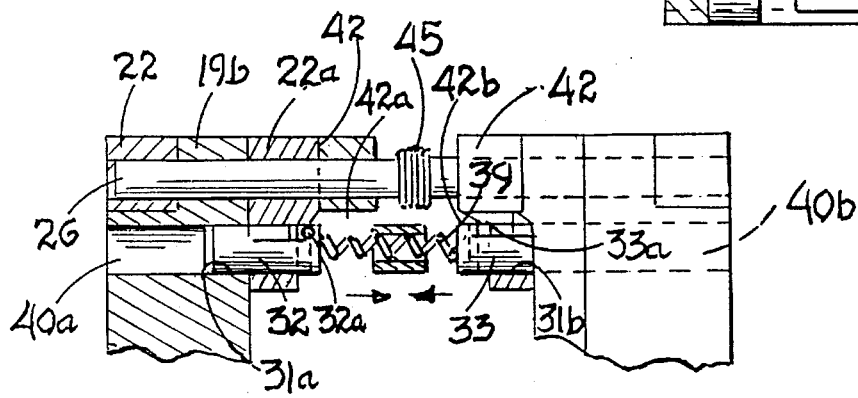
FIG. 10 is a cross sectional view taken along the plane indicated by 10—10 in FIG. 1.
Figure 11:
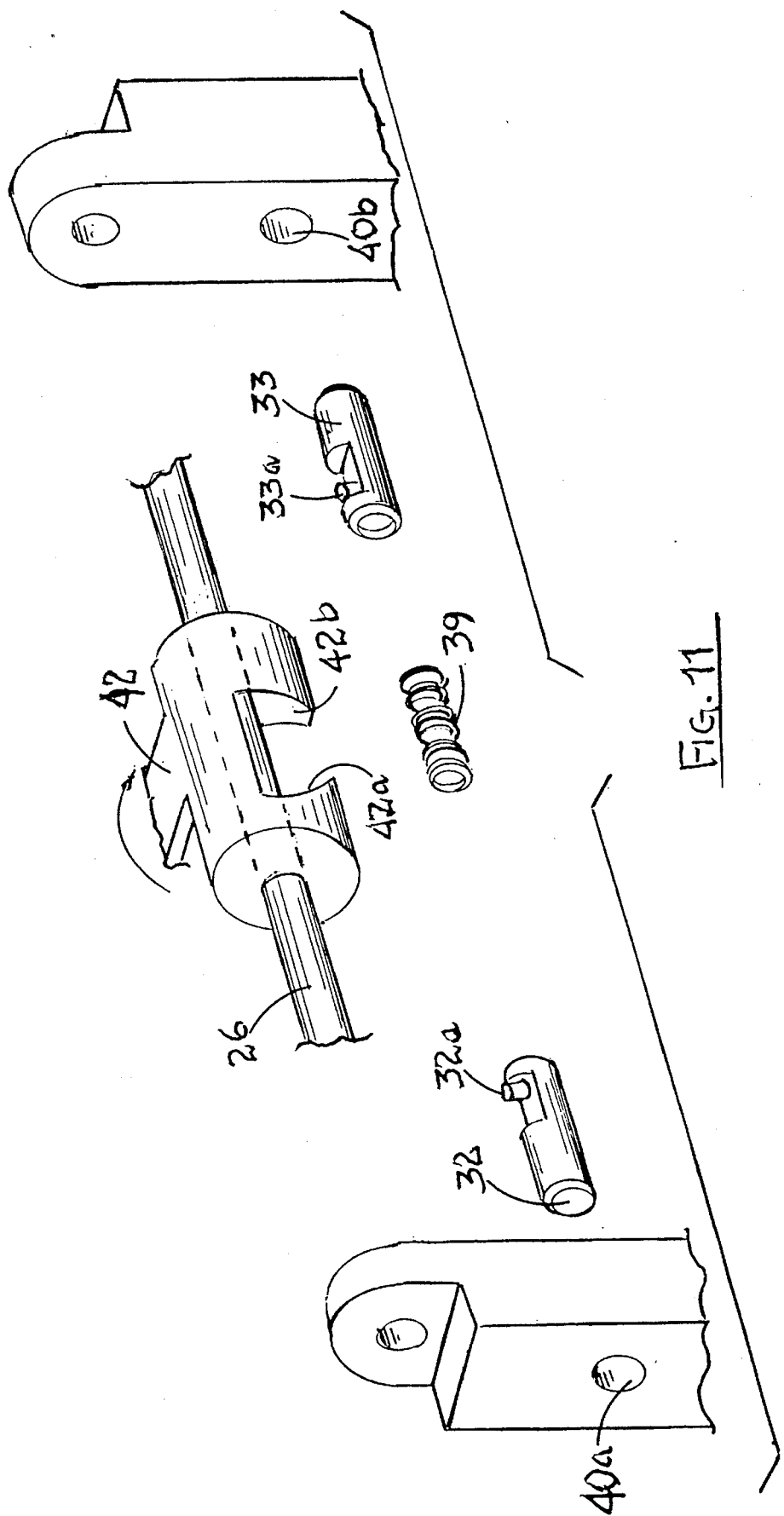
FIG. 11 is an exploded perspective view illustrating the locing pins and the cam lever mechanism of the preferred embodiment.

As best can be seen in FIG. 3, torsion spring 29 is mounted on frame 11 and has its driving end in abutment against rear wall portion 19 such as to urge the rear wall portion forwardly towards the front wall portion 20. Referring particularly to FIG. 10, a pair of pins 32 and 33 are slidably mounted in lateral channels 31a and 31b formed in the central portion 22a of the top plate. When the device is in its raised operative position, pins 32 and 33 extend into channels 40a and 40b formed in the opposing arms 19a and 19b of the rear wall portion, thereby forming a bridge between the rear wall portion and the top plate. These pins have posts 32a and 33a respectively formed thereon. Compression spring 39 is positioned between pins 32 and 33 in abutment against the opposing ends thereof so as to urge the pins apart into channels 40a and 40b when the device is in its raised operative position as shown in FIGS. 1 and 2. Lever 42 has a pair of cams 42a and 42b formed thereon which engage the posts 32a and 33a of pins 32 and 33 respectively. When lever 42 is manually raised against the torsion of spring 45, its cams 42a and 42b drive posts 32a and 33a against the spring tension of spring 39 to withdraw the pins from channels 40a and 40b. When the pins are withdrawn from the channels, plate 22 is released from its upright retention to rear wall portion 19 and the rear wall portion and all of the other members rotatably attached thereto are left free to rotate to the retracted position of FIGS. 3 and 4 in response to the urging of torsion spring 29. With the device in its retracted position, as shown in FIGS. 3 and 4, it presents a relatively flat profile so that cargo can readily be moved thereover.

Figure 6:
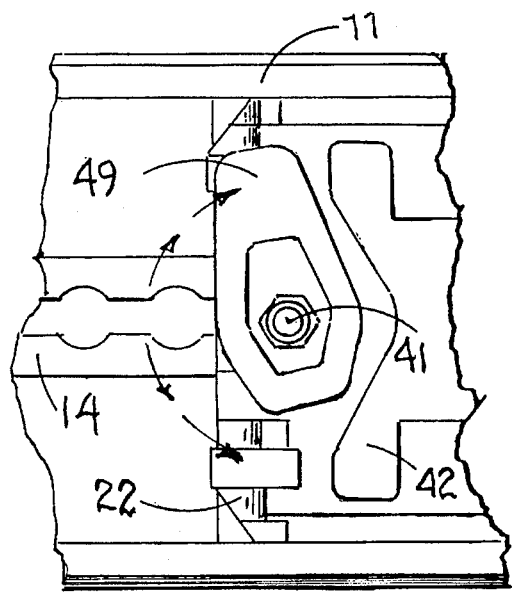
FIG. 6 is a cutaway view illustrating the operation of the pivotal dog of the preferred embodiment.
Figure 7:
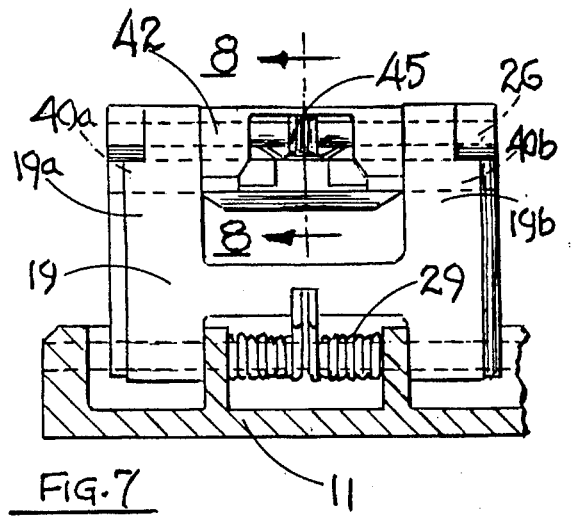
FIG. 7 is a rear elevational view of the preferred embodiment in its raised position.
Figure 8:
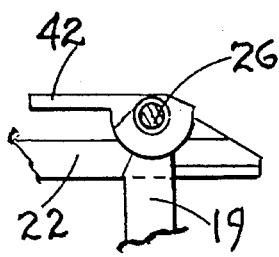
FIG. 8 is a cross sectional view taken along the plane indicated by 8—8 in FIG. 7.
Figure 9:
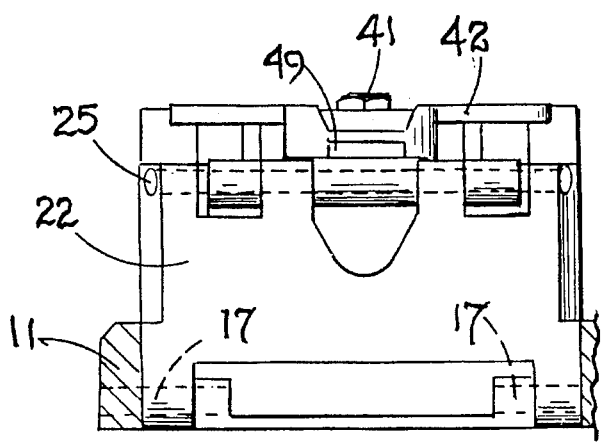
FIG. 9 is a front elevational view of the preferred embodiment in its raised position.

With the device in its raised operative position, as shown in FIGS. 1 and 2, the edge of a pallet 45 will fit under dog 49 which is pivotally mounted on plate 22 by means of bolt 41. The pallet is thus restrained against significant vertical motion by dog 49 and against lateral motion by the front wall portion 20. As can best be seen in FIG. 6, should cargo be loaded(or unloaded) which does not fit under dog 49, the dog will be pivotally driven sidewise by such cargo, thereby permitting it to pass by.

While the invention has been described and illustrated in detail, it is to be clearly understood that this is intended by way of illustration and example only and is not to be taken by way of limitation, the scope of the invention being limited only by the terms of the following claims.

I claim:

1. A device for securing cargo on the floor of a vehicle comprising:

a base frame, means for removably securing said base frame to the vehicle floor, opposing front and rear wall portions pivotally mounted on said base frame, a plate interconnecting the tops of said front and rear wall portions, said plate being pivotally attached to said wall portions, dog member means mounted on said plate for restricting the movement of cargo, spring means for urging said front and rear portions and said plate towards a retracted flat position, means for retaining said front and rear wall portions and said plate in an upright position against the urging of said spring means comprising a pair of locking pins, said plate and said rear wall portions having opposing channels into which said locking pins are fitted in a manner so as to form a locking bridge between said plate and said rear wall portion, and means for actuating said retaining means to permit said spring means to drive said front and rear portions and said plate to said retracted flat position.

2. The device of claim 1 and further including a spring for urging said locking pins into the channels of said rear wall portion.

3. The device of claim 2 wherein said means for actuating said retaining means comprises a lever having cams thereon which engage said locking pins whereby when the lever is actuated the pins are driven out of the channels of said rear wall portion.

4. A device for securing cargo on the floor of a vehicle comprising:

a base frame, means for removably securing said base frame to the vehicle floor, opposing front and rear wall portions pivotally mounted on said base frame, a plate interconnecting the tops of said front and rear wall portions, said plate being pivotally attached to said wall portions, dog member means mounted on said plate for restricting the movement of cargo, spring means for urging said front and rear wall portions and said plate towards a retracted flat position with said plate lying flat against said first wall portion, means for retaining said front and rear wall portions and said plate in an upright position against the urging of said spring means with said wall portions substantially parallel to each other and said plate normal to said wall portions, and means for actuating said retaining means to permit said spring means to drive said front and rear portions and said plate to said retracted flat position.

5. The device of claim 4 wherein said spring means comprises a torsion spring supported on said base frame.

6. A device for securing cargo on the floor of a vehicle comprising:

a mounting base frame, means for removably securing said frame to the vehicle floor, opposing front and rear wall portions pivotally mounted on said frame, a plate interconnecting the tops of said front and rear wall portions, said plate being pivotally attached to said wall portions, a dog member pivotally mounted on said plate, said dog member extending forward of said front wall portion, said plate having a rearwardly extending central portion, said central portion having a laterally extending channel formed therein, said rear wall portion having a pair of laterally extending channels formed therein which are on opposite sides of said rear wall portion and in alignment with the channel of said plate central portion, a pair of locking pins slidably mounted in the channel of said central plate portion, a compression spring mounted between said locking pins, said spring urging each of said locking pins into an opposing one of the channels of said rear wall portion respectively so as to form a bridge between said plate and said rear wall portion, torsion spring means supported on said base frame for urging said front and rear wall portions and said plate towards a retracted flat position, and a lever having a pair of cams thereon which cams matingly engage each of said locking pins respectively, whereby with the manual actuation of said lever the cams thereof drive said locking pins out of the channels of said rear wall portion thereby permitting the torsion spring means to drive the front and rear wall portions and the plate to the retracted flat position.

\* \* \* \* \*